(12) United States Patent
Jain

(10) Patent No.: US 9,519,494 B2
(45) Date of Patent: Dec. 13, 2016

(54) OPTIMIZING APPLICATION RESOURCES

(71) Applicant: Tata Consultancy Services Limited, Mumbai, Maharashtra (IN)

(72) Inventor: Salil Jain, Long Island, NY (US)

(73) Assignee: Tata Consultancy Services Limited, Mumbai (IN)

( * ) Notice: Subject to any disclaimer, the term of this patent is extended or adjusted under 35 U.S.C. 154(b) by 213 days.

(21) Appl. No.: 14/308,210

(22) Filed: Jun. 18, 2014

(65) Prior Publication Data

US 2015/0185997 A1 Jul. 2, 2015

(30) Foreign Application Priority Data

Dec. 30, 2013 (IN) .......................... 4124/MUM/2013

(51) Int. Cl.
*G06F 3/14* (2006.01)
*G06F 9/445* (2006.01)
*G06F 9/44* (2006.01)
*G06F 9/50* (2006.01)
*G06F 11/30* (2006.01)

(52) U.S. Cl.
CPC ............. *G06F 9/445* (2013.01); *G06F 9/4443* (2013.01); *G06F 9/44521* (2013.01); *G06F 9/50* (2013.01); *G06F 11/30* (2013.01)

(58) Field of Classification Search
CPC ..................................... G06F 3/14; G06F 3/17
USPC .................. 715/762; 348/14.09; 709/220
See application file for complete search history.

(56) References Cited

U.S. PATENT DOCUMENTS

| 6,993,586 | B2 | 1/2006 | Chen et al. | |
| 8,489,533 | B2 | 7/2013 | Wang et al. | |
| 2007/0061429 | A1* | 3/2007 | Lin ....................... | G06F 9/5083 709/220 |
| 2015/0264306 | A1* | 9/2015 | Marilly ................. | H04N 7/147 348/14.09 |

OTHER PUBLICATIONS

Mukund Deshpande, George Karypis, Selective Markov models for Predicting Web Page Accesses, ACM Transactions on Internet Technology (TOIT), vol. 4 Issue 2, p. 163-184, May 2004, ACM, New York, NY, USA.

Xing Dongshan, Shen Junyi, A New Markov Model for Web Access Prediction, IEEE Computing in Science and Engineering, vol. 4, Issue 6, p. 34-39, Nov. 2002, IEEE, Piscataway, NJ, USA.

* cited by examiner

*Primary Examiner* — Ruay Ho
(74) *Attorney, Agent, or Firm* — Banner & Witcoff, Ltd.

(57) ABSTRACT

A method for optimizing application resources utilized for rendering graphical user interfaces (GUIs) of an application is described herein. The method comprises receiving a current GUI of the application, wherein the current GUI is a graphical interface view currently being displayed to a user on a display screen of a computing device. Further, it is ascertained whether the current GUI is present a current view sequence wherein the current view sequence comprises one or more GUIs previously viewed by the user. Further, the current view sequence, for the current GUI not being present in the current view sequence, is updated to include the current GUI. Further, at least one probable GUI is determined based on the updating. Further, application resources pertaining to the at least one probable GUI for instant rendering of the at least one probable GUI to the user are obtained.

10 Claims, 3 Drawing Sheets

OPTIMIZING APPLICATION RESOURCES

TECHNICAL FIELD

The present subject matter relates, in general, to application optimization and, particularly but not exclusively, to optimizing application resources.

BACKGROUND

With advancement in technology, software applications have become an integral part of day to day lives for majority of users across the globe. Such software applications provide a convenient platform to users for accessing several services, such as Mobile TV, weather information, stock updates, live scores, multimedia messaging, and the like. In order to optimize the software applications for achieving better efficiency in terms of application resource utilization, application developers typically deploy several application analytics techniques for analyzing and optimizing the application resources.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
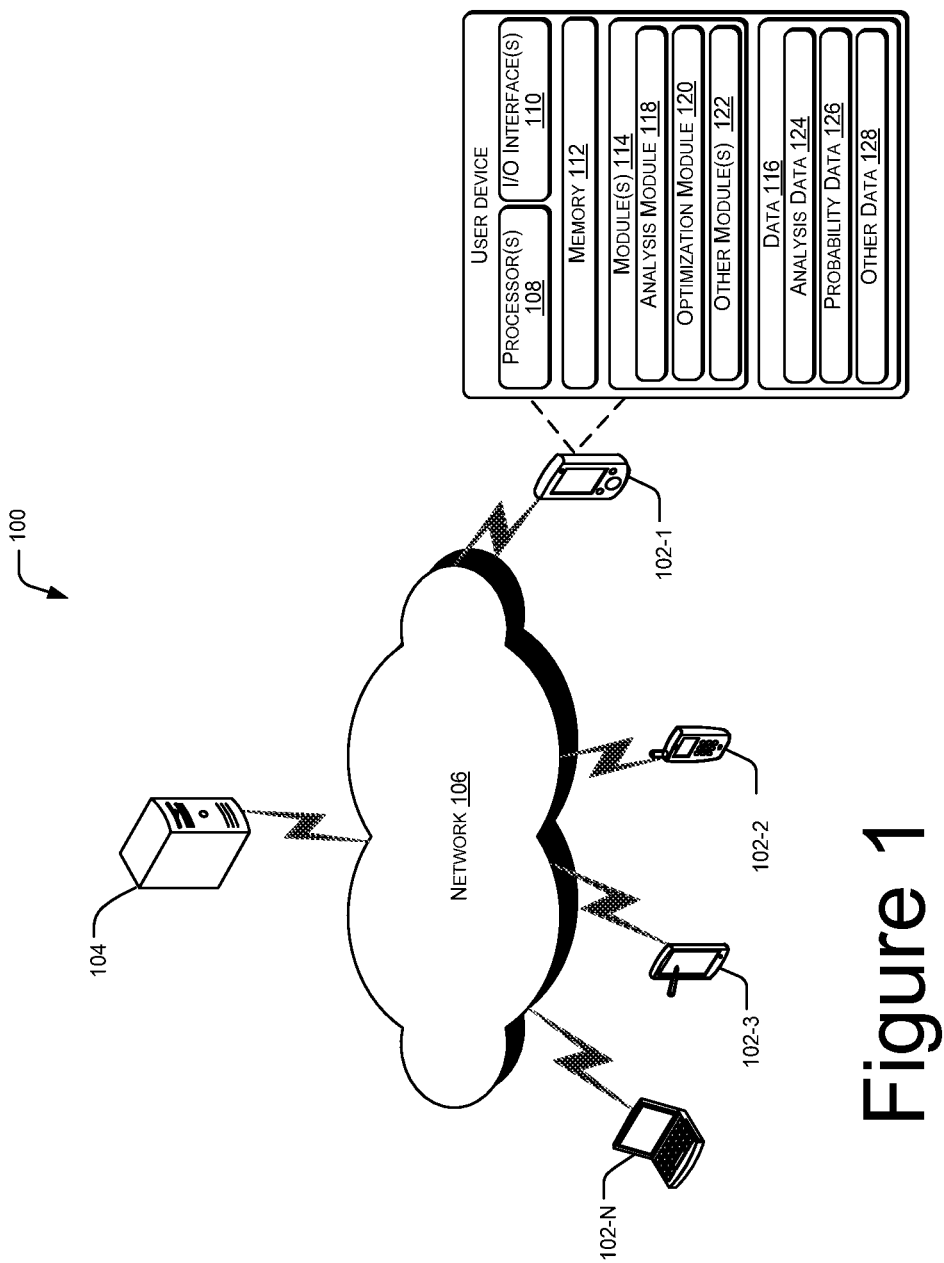
FIG. 1 illustrates a network environment 100 implementing application optimization, in accordance with an implementation of the present subject matter.

Software applications typically provide users with several features and tools for performing a variety of tasks. Typically, such features are provided to the users via one or more graphical user interfaces, hereinafter referred to as interface views, displaying the features and tools of the application. In order to display the interface views to the users, several resources, for example, processing power, memory, execution of instructions, and the like, pertaining to the software application are utilized. For instance, when a user browses through an interface view, application resources corresponding to the interface views are fetched and utilized for rendering the interface view to the user. In certain cases, the time taken for rendering the interface view to the user may be high and may result in degraded performance of the application. For instance, several instructions may have to be executed in order to fetch the application resources corresponding to the interface view thereby increasing the time taken for rendering the interface view to the user in real time. In order to improve the efficiency of the application, application developers nowadays deploy several analytics technique for application optimization. The application optimization may be understood as management of the application resources, for example, memory allocated to the application, data pertaining to the application, instructions and codes pertaining to the applications, and the like for achieving improved application performance. In recent times, application analytics technique based on user's interaction with the application are being adopted for optimizing the application.

One such analytics technique for optimizing applications involves monitoring the number of times a user views an interface view of the application. Based on the monitoring, most frequently browsed interface views are identified and subsequently the application resources corresponding to the identified interface views are pre-fetched for optimizing the application. However, said analytics technique limits the optimization of the application based on the identified frequently browsed interface views.

In another analytics technique based on user's interaction with the application, a user's navigation pattern is recorded. In said analytics technique, conventional markov models are deployed for predicting the next most probable interface view which may be viewed by the user based on the user's navigation pattern. The navigation pattern may be understood as a sequence in which the user views the interface views of the application. However, implementation of the markov models for predicting the next most probable interface view results in a large number of duplicate subsequences, which in turn results in a large number of sequences which are to be analyzed. Thus, the conventional application analytics technique involves large computational time for optimizing the application.

Further, computational devices having high processing power and large memory need to be deployed in order to analyze such large set of sequences. Thus, it may not be feasible to implement such application optimization techniques on devices with less computational power, for example, hand-held devices, smart phones, and mobile devices. Therefore, such devices need to connect to a central server of the application developer for optimizing application resources. Thus, the existing application techniques require constant connectivity with the server for the analytics to be performed. Further, such analytics technique takes into account a collated feedback from a set of users and fails to provide application optimization based on individual user's navigation pattern.

The present subject matter describes method and system for application optimization based on a user's navigation pattern. According to an implementation, application resources, for example, processing power, memory allocated to the application, data associated with different tasks of the application, and the like, pertaining to one or more interface views of an application are pre-fetched based on user's navigation pattern. Pre-fetching of application resources corresponding to the interface views reduces the time required for loading any of the interface view, upon receiving a request from the user.

In an implementation, a current interface view of an application is received. The current interface view may be understood as an interface view which is currently being viewed by the user. Upon receiving the current interface view, it is ascertained whether the current interface view satisfies a duplicate interface view condition or not. The duplicate interface view condition may be understood as a condition, according to which, the current interface view must not match with any of one or more interface views of a current view sequence. The current view sequence may be understood as view sequence comprising the one or more interface views previously viewed by the user. For instance, for a current view sequence comprising interface views $V_1$, $V_2, \ldots,$ and $V_5$, upon receiving an interface view, say $V_n$, the $V_n$ is compared with each of the interface views to ascertain whether the duplicate interface view condition is satisfied or not.

In a case where the duplicate interface view condition is satisfied, the current interface view is included in the current view sequence. As may be understood, the current interface view may be included at the end of the current view sequence. In a case where the duplicate interface view condition is not satisfied, a previous view sequence whose last interface view matches the current interface view is selected. Ascertaining compliance with the duplicate interface view condition results in averting recordation of an interface view multiple times in a view sequence. As a result, the size of the view sequence is reduced, which in turn reduces the time required for application optimization.

Thereafter, application resources pertaining to a probable interface view for instant rendering of the probable interface view are obtained. The probable interface view may be understood as an interface view to which a user may navigate from the current interface view. As may be understood, application resources pertaining to one or more probable interface views may be pre-fetched for loading upon receiving a request from the user. Thus, the memory pertaining to the application may be accordingly optimized for storing the application resources pertaining to the probable interface views.

Thus, the present subject matter facilitates optimization of application resources in a computing device based on a user's navigation pattern. In accordance with the present subject matter, pre-fetching of application resources pertaining to the probable interface view reduces the time required for loading the probable interface view upon user request for loading the probable interface view. Further, since the application resources pertaining only to the probable interface views are stored in the application memory, the memory resource is optimized for better performance. For example, for a given set of interface views $V_1$ to $V_{50}$ of an application, application resources pertaining to identified probable interface views $V_1$, $V_2$, and $V_3$ may be pre-fetched and stored in the memory. As a result upon receiving a request from the user to view any of the aforesaid interface views, the time required for loading the interface view will be significantly reduced, thus resulting in a better experience for the user. Additionally, elimination of duplicate interface views in a view sequence helps in reducing the size of the view sequence thereby enabling optimization of applications running on devices with less computational power and less memory, for example, hand-held devices, mobile devices, smart phones, and the like. Further, the present subject matter facilitates optimization of applications on user devices thus eliminating the need for connecting to a server of the application developer. Moreover, the present subject matter provides application optimization based on individual user's navigation pattern thereby enhancing user's experience.

These and other advantages of the present subject matter would be described in greater detail in conjunction with the following figures. While aspects of described systems and methods for optimizing application resources can be implemented in any number of different computing systems, environments, and/or configurations, the embodiments are described in the context of the following device(s).

FIG. 1 illustrates a network environment 100 implementing application optimization, according to an embodiment of the present subject matter. The network environment 100 includes a plurality of user devices 102-1, 102-2, 102-3, . . . , 102-N, hereinafter collectively referred to as user devices 102 and individually referred to as a user device 102, in communication with a central server 104 of an application developer through a network 106. Communication links between the user devices 102 and the central server 104 are enabled through a desired form of communication, for example, via dial-up modem connections, cable links, digital subscriber lines (DSL), wireless or satellite links, or any other suitable form of communication.

In one implementation, the user devices 102 may be implemented as one or more computing systems, such as personal computers, laptops, wireless devices, and cellular communicating devices, such as a personal digital assistant, a smart phone, and a mobile phone, and the like. Further, the central server 104 may be implemented as one or more systems or user devices, such as a cloud server, a mainframe computer, a workstation, a multiprocessor system, a network computer, and a gateway server. In one implementation, a user of the user device 102 may obtain an application from a central server, such as the central server 104, of an application vendor.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. Further, the network 106 may include network devices that may interact with the central server 104 and the user devices 102 through communication links.

According to an embodiment of the present subject matter, application resources pertaining to the application running on the user device 102 may be optimized for instant rendering of graphical user interfaces, hereinafter referred to as interface views, of the application. Examples of application may include, but are not limited to, software applications, mobile applications, computing device applications, and operating system applications. The application resources may be understood as resources, for example, processor usage, memory allocated to the memory, data pertaining to the application, instructions, codes, and functions, and the like, pertaining to the application. As will be understood, an application running on a computing device, such as the user device 102, may display several features or functionalities provided by the application to a user of the user device 102. The features or functionalities of the application may be provided via different interface views. As will be understood, an application may provide the interface views using known tree structure to the user. In such a structure, different interface views of the application may be structured at different levels in a hierarchical manner. Further, such interface views may be suitably linked with each other and may allow navigation from one level to another.

In one example, the user may browse through one or more interface views of application and a sequence in which the user browses through the interface views of the application is recorded as a view sequence in interface view data. As will be understood, the interface view data may include a plurality of view sequences and a view probability of each of the interface views of the application. The view probability of an interface view may be understood as a probability of a user to navigate to the interface view from another interface view.

In one implementation, user device 102 may include one or more processor(s) 108, I/O interfaces 110, and a memory 112 coupled to the processor 108. The processor 108 can be a single processing unit or a number of units, all of which could include multiple computing units. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions and data stored in the memory 112.

The I/O interfaces 110 may include a variety of software and hardware interfaces, for example, interfaces for peripheral device(s), such as a keyboard, a mouse, a display unit, an external memory, and a printer. Further, the I/O interfaces 110 may enable the user device 102 to communicate with other devices, such as, the central server 104, web servers and external databases. The I/O interfaces 110 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interfaces 110 include one or more ports for connecting a number of computing systems with one another or to a network.

The memory 112 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the user device 102 also includes module(s) 114 and data 116.

The module(s) 114, amongst other things, include routines, programs, objects, components, data structures, etc., which perform particular tasks or implement data types. The module(s) 114 may also be implemented as, signal processor(s), state machine(s), logic circuitries, and/or any other device or component that manipulate signals based on operational instructions.

Further, the module(s) 114 can be implemented in hardware, instructions executed by a processing unit, or by a combination thereof. The processing unit can comprise a computer, a processor, such as the processor 108, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 114 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In one implementation, the module(s) 114 further includes an analysis module 118, optimization module 120, and other module(s) 122. The other modules 122 may include programs or coded instructions that supplement applications and functions of the user device 102.

The data 116 serves, amongst other things, as a repository for storing data processed, received, and generated by one or more of the modules 114. The data 116 includes analysis data 124, probability data 126, and other data 128. The other data 128 includes data generated as a result of the execution of one or more modules in the modules 114.

In operation, the analysis module 118 may receive a current interface view of the application, where the current interface view is an interface view which is currently being displayed on a display screen of the user device 102 to the user. In one example, the current interface view may be determined by pre-determined interface view identification instructions stored in the analysis data 124. The pre-determined interface view identification instructions may be understood as instructions for determining an interface view which is currently being viewed by the user.

Upon receiving the current interface view, the analysis module 118 ascertains whether the current interface view satisfies a duplicate interface view condition or not. In one implementation, the analysis module 118 ascertains compliance of the duplicate interface view condition with respect to a current view sequence. The current view sequence may be understood as a view sequence which is being updated in real time based on the user's navigation through the interface views of the application. The duplicate interface view condition for a view sequence comprising views $V_1$, $V_2$, $V_3$, ..., $V_n$ is given by the equation:

$$V_i \neq V_j, 1 \leq j \leq n \quad (1)$$

where, $V_i$ is the current interface view and $V_j$ is an interface view from among the interface views of the view sequence.

In order to ascertain whether the current interface view satisfies the duplicate interface view condition or not, the analysis module 118 may compare the current interface view with each of the interface views of the current view sequence. For instance, the analysis module 118 may compare a reference number of the current interface view with a reference number of each of the interface views of the current view sequence. Thereafter, the analysis module 118 may determine, based on the comparison, whether the current interface view matches an interface view from among the interface views of the current view sequence. In a case, where the current interface view does not match an interface view of the current view sequence, the analysis module 118 ascertains that the current interface view satisfies the duplicate interface view condition. In such a case, the optimization module 120 may update the current view sequence to include the current interface view in the current view sequence. Further, the optimization module 120 may update a view probability of the current interface view using the relation:

$$P(V_l|V_1, V_2, V_3 \ldots V_{l-1}) \quad (2)$$

where $V_l$ is the current interface view.

In a case where the current interface view matches an interface view of the current view sequence, the analysis module 118 ascertains that the current interface view fails to satisfy the duplicate interface view condition. Failure to comply with the duplicate interface view condition indicates that the user has navigated to an interface view previously recorded in the current view sequence. In such a case, the optimization module 120 may select a previous view sequence from among the plurality of view sequences stored in the interface view data. The previous view sequence may be understood as a view sequence whose last interface view matches the current interface view.

In said case, the optimization module 120 may further compute a back view probability of the current interface view. The back view probability may be understood as a probability of the user to navigate to the current interface view from a last interface view of the current view sequence. For computing the back view probability, the optimization module 120 may initially determine a most probable view, from among the views not selected, of a level to which the current interface view pertains using the equation:

$$\dot{F}_{l+1} = \text{argmax } P(V_{l+1}|V_1,V_2,V_3 \ldots V_l) \text{ where } V_{l+1} \in \tilde{V} - S_{l+1} \quad (3)$$

where, $S_{l+1}$ is the current interface view selected at level l, $\dot{F}_{l+1}$ is the most probable view, and $V_1, V_2, V_3, \ldots, V_l$, and $V_{l+1}$ are the views at level l. Thereafter, the optimization module 120 may determine a probability of going back at the level l of the current interface view using the equation:

$$B_{l+1} = P(V_l|V_1,V_2,V_3 \ldots V_{l+1}) \quad (4)$$

where $B_{l+1}$ is the probability of going back to level l, and $V_1$, $V_2, V_3, \ldots V_l$, and $V_{l+1}$ are the views at level l. In said implementation, the optimization module 120 may then compute the back probability for the current interface view by using equation (3) and equation (4) and may obtain the back view probability given by the relation:

$$\dot{F}_k = \text{argmax}\left(\prod_{i=k}^{n} B_i\right) P(\dot{F}_k | V_1, V_2, V_3 \ldots V_{k-1}) \quad (5)$$

where $\dot{F}_k$ is the most probable view, $(\Pi_{i=k}^{n} B_i)$ is the probability of going back to the level k from n, $P(\dot{F}_k|V_1, V_2, V_3 \ldots V_{k-1})$ is the probability of selecting $\dot{F}_k$ at level k−1. Further, as will be understood, the value of i may vary from two to n.

In another implementation, the optimization module 120 may compute a most probable view at n+1th level by considering all the interface views at level n+1 using the following expression:

$$F_{n+1} \text{ argmax } P(V_{n+1}|V_1,V_2,V_3 \ldots V_n) \text{ where } V_{n+1} \in \tilde{V} \quad (6)$$

In one implementation, the optimization module 120 may store the back view probability and the most probable view at n+1th level in the interface view data. Upon updation of the interface view data, the optimization module 120 may then determine one or more probable interface view. The probable interface view may be understood as an interface view to which the user may navigate from the current interface view. In one implementation, the optimization module 120 may determine the probable interface views based on at least one of a view probability and a back view probability of one or more interface views linked to the current interface view. For instance, the optimization module 120 may analyze the view interface data to identify at least one probable interface view from among the interface views linked with the current interface view based on the corresponding view/back view probability. Similarly, the optimization module 120 may select one or more probable interface views based on their decreasing order of view/back view probability.

Thereafter, the optimization module 120 may obtain the application resources pertaining to at least one probable interface views for rendering the probable interface view to the user upon receiving a request for the same. For instance, the optimization may retrieve corresponding data, execute instructions for retrieving the interface views from the application memory, and arrange the application resources in the application memory. Thus, upon receiving a request from the user to load any of the probable views, the time taken to load the interface view is reduced.

Figure 2:
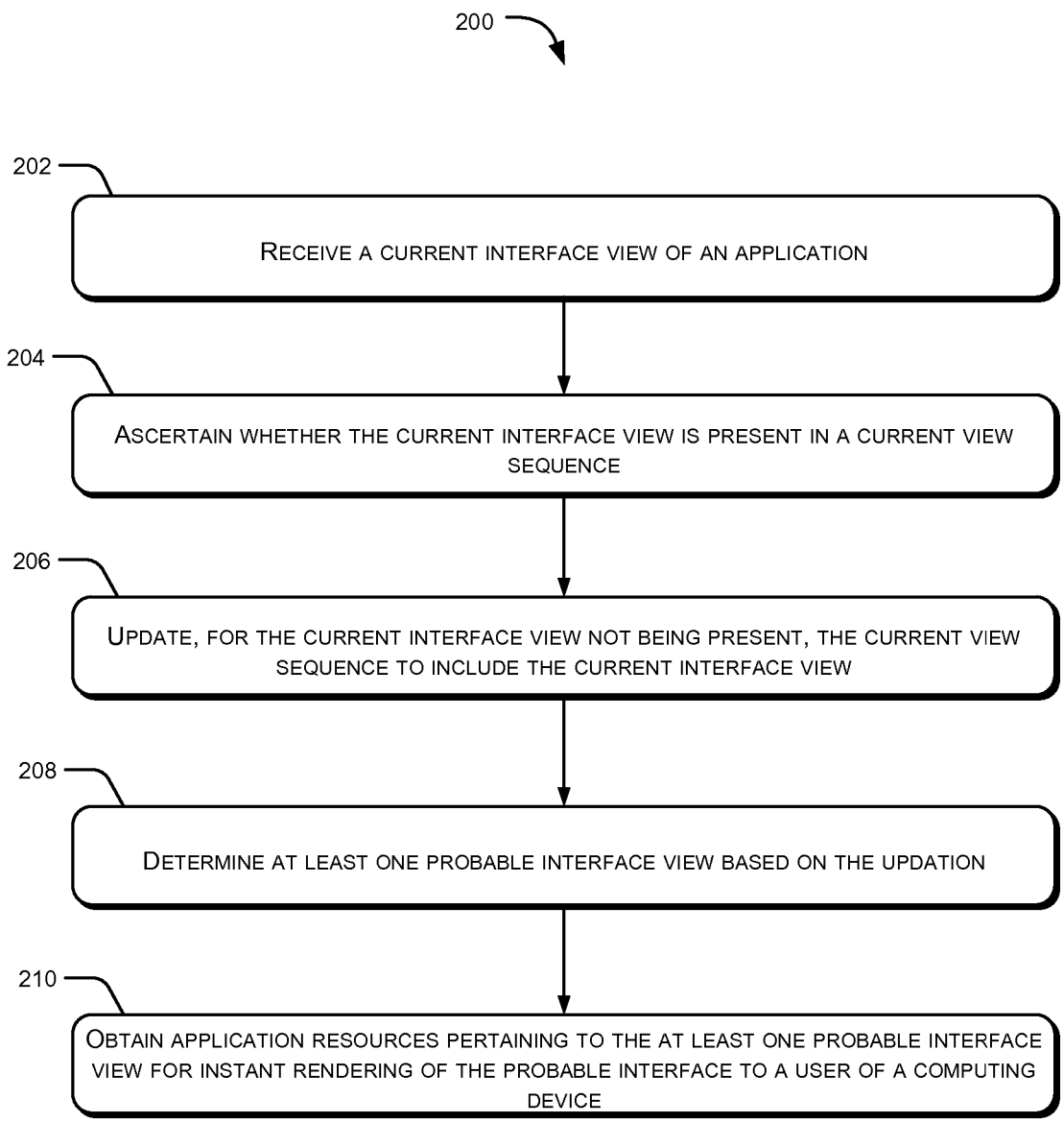
FIG. 2 illustrates a method for application optimization for rendering graphical interface views of an application running on a computing device, in accordance with an implementation of the present subject matter.
Figure 3:
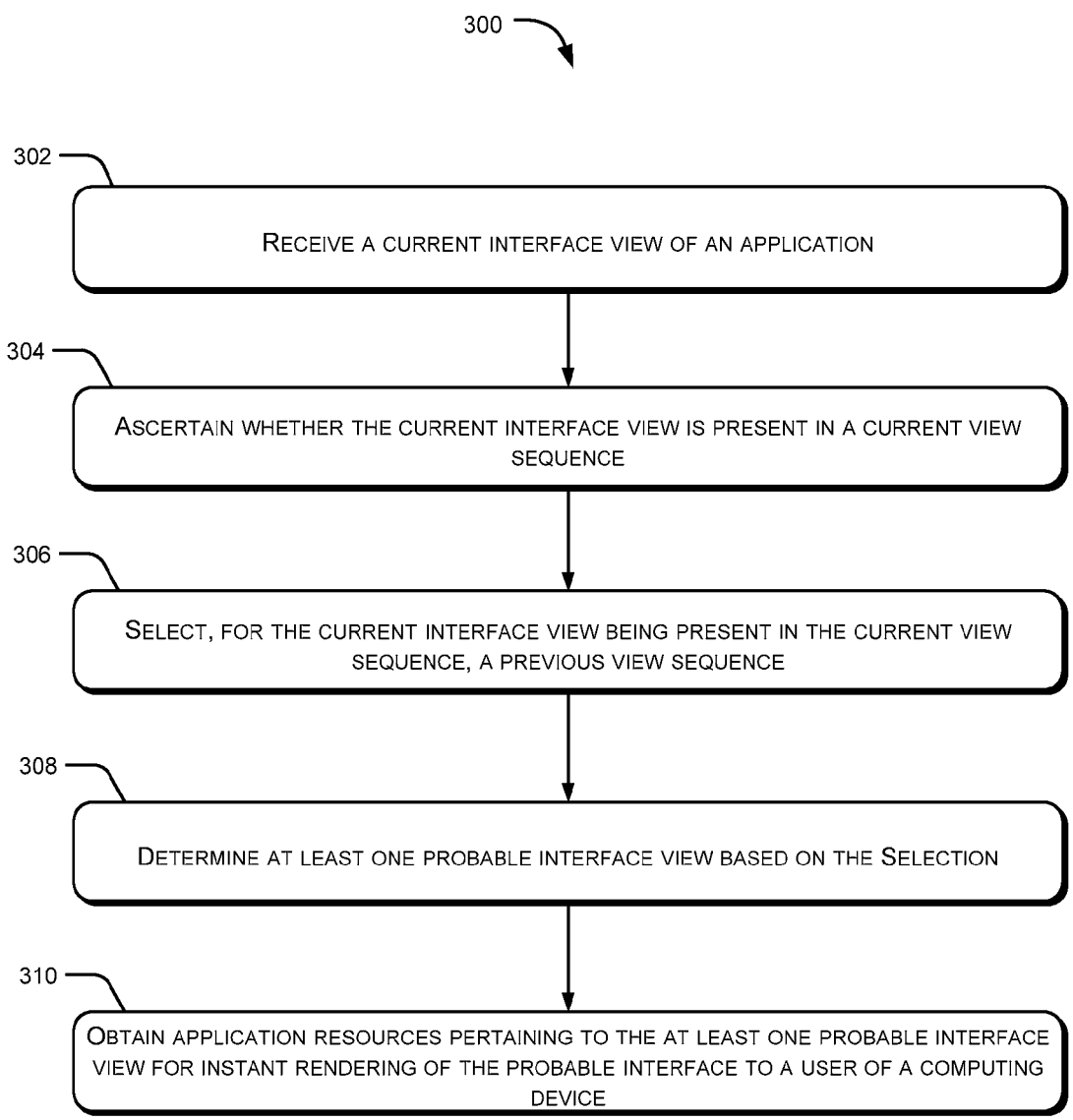
FIG. 3 illustrates a method for application optimization for rendering graphical interface views of an application running on a computing device, in accordance with an implementation of the present subject matter.

FIG. 2 and FIG. 3 illustrate methods 200 and 300, respectively, for application optimization for rendering graphical interface views of an application running on a computing device, according to an implementation of the present subject matter. The methods 200 and 300 may be described in the general context of computer executable instructions. Generally, computer executable instructions can include routines, programs, objects, components, data structures, procedures, modules, functions, etc., that perform particular functions or implement particular abstract data types. The methods 200 and 300 may also be practiced in a distributed computing environment where functions are performed by remote processing devices that are linked through a communications network. In a distributed computing environment, computer executable instructions may be located in both local and remote computer storage media, including memory storage devices.

The order in which the methods 200 and 300 are described is not intended to be construed as a limitation, and any number of the described method blocks can be combined in any order to implement methods 200 and 300, or an alternative method. Additionally, individual blocks may be deleted from the methods 200 and 300 without departing from the scope of the subject matter described herein. Furthermore, the methods 200 and 300 may be implemented in any suitable hardware, machine readable instructions, firmware, or combination thereof.

A person skilled in the art will readily recognize that steps of the methods 200 and 300 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described methods 200 and 300. The program storage devices may be, for example, digital memories, magnetic storage media, such as a magnetic disks and magnetic tapes, hard drives, or optically readable digital data storage media.

With reference to FIG. 2, at block 202, a current interface view of an application is received. The term ' interface view', as used herein, may be understood as a graphical user interface, presented to a user, representing one or more features or services offered by the application. The current interface view may be understood as an interface view currently being displayed via a display screen to the user. In one example, the analysis module 118 may receive the current interface view.

At block 204, it is ascertained whether the current interface view is present in a current view sequence. In one example, the current interface view may be compared with each of the interface views of the current view sequence. Based on the comparison, it is determined whether the current interface view matches an interface view from among the one or more interface views. In a case where the current interface view does not match an interface view of the current view sequence, it is ascertained that the current interface view is not present in the current view sequence. In said case, the current interface view is said to satisfy the duplicate view condition as explained above in FIG. 1 using equation (1). In one implementation, the analysis module 118 may ascertain whether the current interface view satisfies a duplicate interface view condition based on a current view sequence.

At block 206, the current view sequence, for the current interface view not being present in the current view sequence, is updated. In the case where the current interface view satisfies the duplicate interface view condition, the current interface view is recorded in the current view sequence. In one implementation, the optimization module 120 updates the current view sequence. Thereafter, a view probability of the current interface view is computed as described in FIG. 1 using equation (2). The view probability of the current interface view may be understood as a probability of a user to navigate to the current interface view from another interface view.

At block 208, at least one probable interface view is determined based on the updation. The probable interface view may be understood as an interface view to which the user may navigate to from the current interface view. In one implementation, the probable interface view may be determined based on at least one of a view probability and a back view probability of one or more interface views linked to the current interface view. In one implementation, the optimization module 120 may determine the at least one probable interface view.

At block 210, application resources pertaining to the at least one probable interface view are obtained. In one implementation, the application resources pertaining to the probable interface view identified in the block 208 are obtained for instant rendering of the interface view to a user of a computing device. For instance, application resources such as, data pertaining to the probable interface view, images, graphical operations, and the like associated with the probable interface view are obtained.

With reference to FIG. 3, at block 302, a current interface view of an application is received. The term ' interface view', as used herein, may be understood as a graphical user interface, presented to a user, representing one or more features or services offered by the application. The current interface view may be understood as an interface view currently being displayed via a display screen to the user. In one example, the analysis module 118 may receive the current interface view.

At block 304, it is ascertained whether the current interface view is present in a current view sequence. In one example, the current interface view may be compared with each of the interface views of the current view sequence. Based on the comparison, it is determined whether the current interface view matches an interface view from among the one or more interface views. In a case where the current interface view matches an interface view of the current view sequence, it is ascertained that the current interface view is present in the current view sequence. In said case, the current interface view fails to satisfy the duplicate view condition as explained above in FIG. 1 using equation (1). In one implementation, the analysis module 118 may ascertain whether the current interface view satisfies a duplicate interface view condition based on a current view sequence.

At block 306, a previous view sequence, for the current interface view being present in the current view sequence, is selected. In the case where the current interface view does not satisfy satisfies the duplicate interface view condition, a previous view sequence, i.e., a view sequence having last interface view similar to the current interface view is selected. In one implementation, the optimization module 120 may select the previous view sequence. Thereafter, a back view probability for the current interface view is computed as described in FIG. 1 using equation (3), equation (4), and equation (5).

At block 308, at least one probable interface view is determined based on the selection. The probable interface view may be understood as an interface view to which the user may navigate to from the current interface view. In one implementation, the probable interface view may be determined based on at least one of a view probability and a back view probability of one or more interface views linked to the current interface view. In one implementation, the optimization module 120 may determine the at least one probable interface view.

At block 310, application resources pertaining to the at least one probable interface view are obtained. In one implementation, the application resources pertaining to the probable interface view identified in the block 208 are obtained for instant rendering of the interface view to a user of a computing device. For instance, application resources, such as data pertaining to the probable interface view, images, graphical operations, and the like associated with the probable interface view are obtained.

Although implementations for methods and systems for application optimization are described, it is to be understood that the present subject matter is not necessarily limited to the specific features or methods described. Rather, the specific features and methods are disclosed as implementations for application optimization.

I claim:

1. A method for optimizing application resources utilized for rendering graphical user interfaces (GUIs) of an application running on a computing device, the method comprising:
   receiving a current GUI of the application, wherein the current GUI is a graphical interface view currently being displayed to a user on a display screen of the computing device;
   ascertaining whether the current GUI is present in a current view sequence, wherein the current view sequence comprises one or more GUIs, from amongst a plurality of GUIs of the application, previously viewed by the user;
   selecting, for the current GUI being present in the current view sequence, a previous view sequence, wherein a last GUI of the previous view sequence matches the current GUI;
   updating, for the current GUI, a back view probability, wherein the back view probability indicates a probability of the user to navigate to the current GUI from a last GUI of the current view sequence;
   determining at least one probable GUI based on the selection; and
   obtaining application resources pertaining to the at least one probable GUI for instant rendering of the at least one probable GUI to the user, wherein the at least one probable GUI is a GUI to which the user may navigate from the current GUI.

2. The method as claimed in claim 1, wherein if the current GUI is not present in the current view sequence, then the method further comprises updating the current view sequence to include the current GUI and further updating a view probability of the current GUI, wherein the view probability indicates a probability of the user to navigate to the current GUI from another GUI.

3. The method as claimed in claim 1, wherein the ascertaining further comprises comparing the current GUI with each of the one or more GUIs of the current view sequence to determine whether the current GUI matches a GUI from among the one or more GUIs.

4. The method as claimed in claim 1, wherein the method further comprises updating GUI data, wherein the GUI data comprises at least a view probability and a back view probability for each of the plurality of GUIs.

5. A user device comprising:
   a processor;
   an analysis module coupled to the processor to,
      receive a current graphical user interface (GUI) of an application, wherein the current GUI is a GUI currently being displayed to a user on a display screen of a computing device;
      ascertain whether the current GUI is present in a current view sequence, wherein the current view sequence comprises one or more GUIs, from amongst a plurality of GUIs of the application, previously viewed by the user; and
   an optimization module coupled to the processor to,
      select, for the current GUI being present in the current view sequence, a previous view sequence, wherein a last GUI of the previous view sequence matches the current GUI;
      update, for the current GUI, a back view probability, wherein the back view probability indicates a probability of the user to navigate to the current GUI from a last GUI of the current view sequence;
      determine at least one probable GUI based on the selection; and
      obtain application resources pertaining to at least one probable GUI for instant rendering of the at least one probable GUI to the user, wherein the at least one probable GUI is a GUI to which the user may navigate from the current GUI.

6. The user device as claimed in claim 5, wherein the optimization module further updates GUI data, wherein the GUI data comprises at least a view probability and a back view probability for each of the plurality of GUIs.

7. The user device as claimed in claim 5, wherein the analysis module further,
compares the current GUI with each of the one or more GUIs of the current view sequence to determine whether the current GUI matches a GUI from among the one or more GUIs.

8. A computer-readable medium having embodied thereon a computer program for executing a method comprising:
   receiving a current graphical user interface (GUI) of an application, wherein the current GUI is a GUI currently being displayed to a user on a display screen of a computing device;
   ascertaining whether the current GUI is present in a current view sequence, wherein the current view sequence comprises one or more GUIs, from amongst a plurality of GUIs of the application, previously viewed by the user;
   selecting, for the current GUI being present in the current view sequence, a previous view sequence, wherein a last GUI of the previous view sequence matches the current GUI;
   updating, for the current GUI, a back view probability, wherein the back view probability indicates a probability of the user to navigate to the current GUI from a last GUI of the current view sequence;
   determining at least one probable GUI based on the selection; and
   obtaining application resources pertaining to the at least one probable GUI for instant rendering of the at least one probable GUI to the user, wherein the at least one probable GUI is a GUI to which the user may navigate from the current GUI.

9. The computer-readable medium as claimed in claim 8, wherein the ascertaining further comprises comparing the current GUI with each of the one or more GUIs of the current view sequence to determine whether the current GUI matches a GUI from among the one or more GUIs.

10. The computer-readable medium as claimed in claim 8, wherein the method further comprises updating GUI data, wherein the GUI data comprises at least a view probability and a back view probability for each of the plurality of GUIs.

* * * * *